(12) United States Patent
Tremblay

(10) Patent No.: US 7,083,758 B2
(45) Date of Patent: Aug. 1, 2006

(54) FREE FLOWING DRY BACK-UP INSULATING MATERIAL

(75) Inventor: Sylvain P. Tremblay, Chicoutimi (CA)

(73) Assignee: Les Produits Industriels de Haute Temperature Pyrotek Inc., Drummondville (CA)

(*) Notice: Subject to any disclaimer, the term of this patent is extended or adjusted under 35 U.S.C. 154(b) by 70 days.

(21) Appl. No.: 10/722,447

(22) Filed: Nov. 28, 2003

(65) Prior Publication Data

US 2005/0116398 A1    Jun. 2, 2005

(51) Int. Cl.
*C21C 5/44*    (2006.01)
*C21B 7/02*    (2006.01)

(52) U.S. Cl. .................. 266/280; 501/94; 501/96.4
(58) Field of Classification Search ............ 266/280; 501/94, 96.4
See application file for complete search history.

(56) References Cited

U.S. PATENT DOCUMENTS

| | | |
|---|---|---|
| 2,499,729 A | 3/1950 | Daussan |
| 3,933,513 A | 1/1976 | Mellows |
| 4,221,595 A | 9/1980 | Zebrowski |
| 4,222,782 A | 9/1980 | Alliegro et al. |
| 4,253,590 A | 3/1981 | Holt et al. |
| 4,393,143 A | 7/1983 | Yoshinaka et al. |
| 4,432,799 A | 2/1984 | Salazar |
| 4,440,865 A | 4/1984 | Salazar |
| 4,486,546 A | 12/1984 | Murakami et al. |
| 4,495,301 A | 1/1985 | Sutor |
| 4,514,531 A | 4/1985 | Kleeb et al. |
| 4,624,711 A | 11/1986 | Styron et al. |
| 4,762,305 A | 8/1988 | Rice |
| 4,769,352 A | 9/1988 | Stark |
| 4,869,468 A | 9/1989 | Johnson |
| 4,874,726 A | 10/1989 | Kleeb et al. |
| 5,252,526 A | 10/1993 | Whittemore |
| 5,284,808 A | 2/1994 | Damiano et al. |
| 5,302,563 A | 4/1994 | Rumpeltin et al. |
| 5,366,944 A | 11/1994 | Rumpeltin et al. |
| 5,374,308 A | 12/1994 | Kirkpatrick et al. |
| 5,567,519 A | 10/1996 | Stoney, III et al. |
| 5,632,326 A | 5/1997 | Gough |
| 5,744,413 A | 4/1998 | Cortellini |
| 5,954,872 A * | 9/1999 | Benson ................... 501/111 |
| 6,284,688 B1 | 9/2001 | Trinkl et al. |
| 6,444,162 B1 | 9/2002 | Anshits et al. |
| 6,458,732 B1 | 10/2002 | Doza et al. |

FOREIGN PATENT DOCUMENTS

| | | |
|---|---|---|
| CA | 1 034 706 | 7/1978 |
| JP | 401192773 A * | 8/1989 |

* cited by examiner

*Primary Examiner*—Scott Kastler
(74) *Attorney, Agent, or Firm*—Robic

(57) ABSTRACT

Disclosed is a free flowing dry back-up material which comprises:
  from 67 to 96% by weight of fly-ash;
  from 2 to 15% by weight of a heat sensitive binder such as boric acid;
  from 2 to 7% by weight of a non-wetting agent such as calcium fluoride;
  from 0 to 10% by weight of a heat expandable material, viz. a material expandable as a function of the temperature such as vermiculite or graphite; and
  from 0 to 1% by weight of a dust suppressant such as kerosene.

This material which is useful in particular in the aluminum industry has the advantages of being water free and free flowing, such avoiding the use of vibrator to position it into a shell. It also has a low density and a low thermal conductivity. Moreover, it is organic free as compared to the existing materials which use an organic binder to ensure a low temperature set; and it sets at a temperature lower than 400° F.

11 Claims, No Drawings

FREE FLOWING DRY BACK-UP INSULATING MATERIAL

FIELD OF THE INVENTION

The present invention relates to a free flowing dry back-up insulating material.

BACKGROUND OF THE INVENTION

In the aluminum industry, it is of common practice to convey aluminum in insulated troughs or filter boxes comprising a steel shell in which a refractory working lining is mounted to resist to the molten aluminum attack. Because the refracting working lining is usually quite conductive, a good insulating material has to be placed between the refractory working lining and the steel shell to reduce heat losses. Such an insulating material is called "back-up insulating material". If needs be, a ceramic paper may also be placed in between the back-up insulating material and the steel shell to protect the same in the case molten aluminum would infiltrate the back-up insulating material.

As an example of back-up insulating material presently in use, reference can be made to the one sold under the trademark WOLLITE®. This material which forms the subject matter of U.S. Pat. No. 5,360,771 issued on Nov. 1, 1994, is a solid, light weight mineral foam obtained by reaction of a wollastonite suspension containing a small quantity of calcium carbonate with a phosphoric acid solution. The phosphoric acid reacts with the carbonate and generates $CO_2$ gas that foams the reacted product.

If WOLLITE® has proved to be very efficient, it still has the "drawback" of using water during its preparation. In practice, water has to be removed completely to avoid safety problem since it could come in contact with molten aluminum. Depending on where the above material is installed, it is sometimes difficult to get rid of the water before the material is used, especially if it is installed at a plant level.

Apart the above mentioned product, use has also been made so far of other back-up insulating materials like the one sold under the trademarks DRI-LITE™ by Matrix Refractories or E-ZPOUR™ by RexRoto. This latter is essentially a vermiculite powder with no binder. This material is efficient also but not free flowing. It actually needs a vibrator to be installed. Moreover, since it does not sinter, this material may fall out and has to be replaced everytime a working lining is replaced.

SUMMARY OF THE INVENTION

The present invention is directed to a new back-up insulating material which has a thermal conductivity similar to the one of WOLLITE® but contains no water and is free-flowing with a heat sensitive bond.

More specifically, the invention is directed to a free flowing dry back-up material which comprises:

from 67 to 96% by weight of fly-ash;

from 2 to 15% by weight of a heat sensitive binder;

from 2 to 7% by weight of a non-wetting agent;

from 0 to 10% by weight of a heat expandable material, viz. a material expandable as a function of the temperature; and from 0 to 1% by weight of a dust suppressant.

The material according to the invention has the following characteristics:

1. it is water free;
2. it is free flowing (it does not require a vibrator or mechanical means to position it into the steel shell);
3. it is of low density as compared to the existing materials (for example, 25–30 lb/cu.ft., as compared to 60 lb/cu.ft and more);
4. it has a low thermal conductivity as compared to the existing materials (it exhibits a thermal conductivity of less than 1 BTU-in/sq.ft./hr F as compared to a conductivity of 2.5 BTU-in/sq.ft./hr F and more for the existing material);
5. it is organic free, as compared to the existing materials which use an organic binder to ensure a low temperature material set; and
6. it sets at a temperature lower than 400° F. as compared to 600° F. and more for the existing materials.

The invention, its uses and advantages will be better understood upon reading the following detailed but not restrictive description of it.

DETAILED DESCRIPTION OF THE INVENTION

As aforesaid, the free flowing dry back-up material according to the invention is made of a mixture of "fly-ash", a heat sensitive binder and a non-wetting agent. The material may also comprise a heat expandable material and a dust suppressant.

"Fly-ash" is a known coal combustion by-product produced in coal fired utilities. It is usually in the form of ceramic hollow microspheres (also called "cenospheres"), which are formed during the burning of coal. These cenospheres basically consists of silica ($SiO_2$) and alumina ($Al_2O_3$) and comprises nitrogen and/or other gases within their cavities.

The heat sensitive binder can be any kind of binders known to have a low sintering temperature. As examples of such a binder, reference can be made to boric acid and anhydrous boric oxide.

The non-wetting agent can be any kind of agent known to have this property. As examples of such non-wetting agent, reference can be made to calcium fluoride, magnesium fluoride and barium sulfate.

The heat expandable material that is optionally used in the composition can be vermiculite or graphite.

The dust suppressant that is also optionally used in the composition can also be any kind of product known to have such a property. As examples of such dust suppressant, reference can be made to kerosene, mineral oils and vegetable oils.

In use, these components that are in the form of microspheres and powders, are mixed together and "fed" into the structure for which a back-up insulation is required. As examples of such a structure, reference can be made to the troughs or filter boxes used in the aluminum industry (see the "Background of the Invention" hereinabove).

However, it may be understood that the same material could also be used with other structures for which a back-up insulation is required, like, for examples, those used in the steel industry or the glass industry.

As aforesaid, the back-up insulating material according to the invention has numerous advantages. In this connection, reference can be made again to the list of characteristics given in the Summary of the Invention hereinabove.

EXAMPLE

Free flowing dry back-up insulating materials according to the invention were prepared using the following basic comments in slightly different concentrations.
  cenospheres as fly-ash;
  anhydrous boric oxyde as heat sensitive binder;
  calcium fluoride as non-wetting agent; and
  kerosene as dust suppressant.

The chemical formulations of the so-prepared materials were comprised in the following ranges, depending on the selected concentrations of basic components used for their preparation.

| (%) weight basis | |
|---|---|
| $Al_2O_3$ | 23–28 |
| $SiO_2$ | 51–61 |
| Crystalline Silica | 0.5–0.6 |
| $TiO_2$ | 0.8–0.9 |
| $Fe_2O_3$ | 3.0–4.0 |
| $B_2O_3$ | 5–15 |
| $CaF_2$ | 2–5 |
| Dust suppressant | 0–0.5 |

Their properties were as follows:

| Properties | |
|---|---|
| Density | 25–30 (lb/ft$^3$) |
| Maximum use temperature | 900° C. (1650° F.) |
| Installation method | free-flowing |
| Storage life | 24 months |

Thermal conductivity tests were carried out onto one of these materials, the composition of which was as follows:
  from about 89.5% to 90% by weight of fly ash;
  about 8% by weight of heat sensitive binder;
  about 2% by weight of non-wetting agent; and
  from about 0 to 0.5% by weight of dust suppressant.
The results of these tests were as follows:

| Thermal conductivity | | | |
|---|---|---|---|
| Mean ° F. | Temperature ° C. | $\frac{BTU \cdot in}{ft^2 \cdot hr \cdot ° F.}$ | $\frac{W}{m \cdot ° K}$ |
| 275 | 135 | 0.85 | 0.122 |
| 504 | 262 | 1.01 | 0.145 |
| 732 | 389 | 1.19 | 0.172 |
| 961 | 516 | 1.42 | 0.205 |
| 1202 | 650 | 1.82 | 0.262 |

To sum up, the so-prepared free-flowing dry insulating materials have proved to flow like water and to exhibit very low density as well as excellent insulating properties. They were tested with success as insulating back-up in a trough used for working lining in the aluminum industry for minimizing heat loss at operating temperatures up to 900° C. (1650° F.). They actually have proven to offer the following benefits and features:
  no free water;
  no organic binder;
  free-flowing;
  lightweight;
  low thermal conductivity; and
  heat set bond developed as low as 200° C. (392° F.).

The invention claimed is:

1. A free flowing dry back-up insulating material having a thermal conductivity ranging between about 0.8 and about 1.8 BTU·in/ft$^2$·hr.·° F. and a setting temperature lower than 400° F., wherein said material consists essentially of:
  a) from 67 to 96% by weight of fly-ash comprising cenospheres,
  b) from 2 to 15% by weight of a heat sensitive binder selected from the group consisting of boric acid and anhydrous boron oxide;
  c) from 2 to 7% by weight of a non-wetting agent selected from the group consisting of calcium fluoride, magnesium fluoride and barium sulphate;
  d) from 0 to 10% by weight of a heat expandable material selected from the group consisting of vermiculite and graphite; and
  e) from 0 to 1% by weight of a dust suppressant.

2. The material of claim 1, wherein said material consists essentially of:
  a) from about 89.5% to 90% by weight of said fly ash;
  b) about 8% by weight of said heat sensitive binder;
  c) about 2% by weight of said non-wetting agent; and
  d) from about 0 to 0.5% by weight of said dust suppressant.

3. The material of claim 1, wherein said binder is boric acid.

4. The material of claim 1, having a thermal conductivity of up to 1.42 BTU·in/ft.$^2$·hr.·° F.

5. The material of claim 1, which is free of organics.

6. The material of claim 1, wherein said binder is anhydrous boron oxide.

7. The material of claim 1, which contains 2 to 5 wt % of calcium fluoride.

8. The material of claim 1, which contains kerosene as a dust suppressant.

9. The material of claim 1, having a density of from 25 to 30 lb/ft.$^3$.

10. The material of claim 5, which is free of organic binders.

11. The material of claim 1, which further consists of $TiO_2$ and $Fe_2O_3$.

* * * * *